Oct. 6, 1942.           M. B. SAWYER           2,297,988
                      MOTOR CONSTRUCTION
                      Filed Feb. 17, 1941
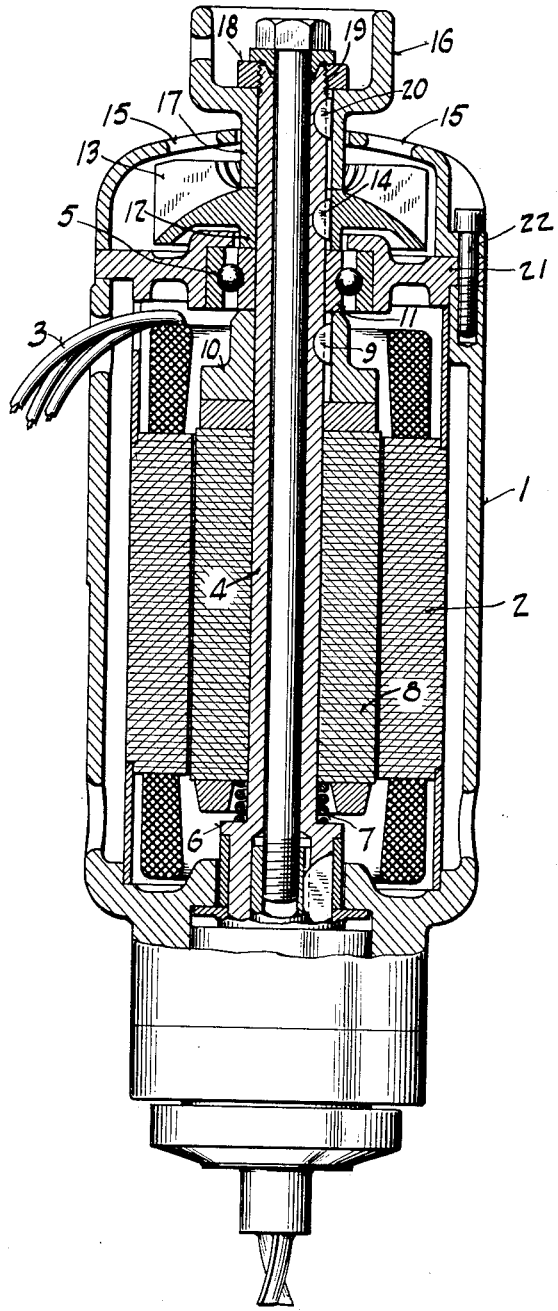
Marion B. Sawyer
INVENTOR.
BY *Elvin A. Andrus*
ATTORNEY.

Patented Oct. 6, 1942

2,297,988

UNITED STATES PATENT OFFICE 2,297,988

MOTOR CONSTRUCTION

Marion B. Sawyer, Los Angeles, Calif., assignor to Sawyer Electrical Mfg. Co., Los Angeles, Calif., a corporation of California Application February 17, 1941, Serial No. 379,163

3 Claims. (Cl. 172—120)

This invention relates to electric motor construction.

An object of the invention is to provide an improved construction for electric motors.

Another object of the invention is to provide an improved construction that is particularly adapted for use in high cycle induction motors designed to operate at high speeds of rotation.

These and other objects of the invention will be clear from the following detailed description and the accompanying drawing in which the sole figure is a longitudinal section through the pertinent parts of a motor constructed in accordance with the invention.

While not limited thereto, the invention is illustrated and described in connection with one type of motor for which it is particularly well adapted, namely, an induction router motor fed with high cycle electric current to produce a high speed of rotation.

The motor comprises a casing 1 with a stator winding 2 energised by current supplied through leads 3. A hollow shaft or spindle 4 which extends lengthwise of the motor is supported adjacent the upper end by radial bearing 5 and at the lower end within the portion shown in elevation, by suitable radial and thrust bearings which form no part of this invention. The lower end of the spindle is also provided with suitable means for the attachment of routing cutters, but as these, also, form no part of the invention, they are now shown in detail.

Toward its lower end the hollow spindle 4 is provided with an external shoulder 6 which serves as an abutment for the lower end of coil spring 7, the upper end of the spring abutting against the motor rotor 8. The rotor 8 is a light press fit on the spindle so that it can be readily removed in case damage to either the spindle or the rotor necessitates replacement of one or the other. It has been found that when a tight press fit is employed to insure the transference of torque from the rotor to the spindle, removal is impracticable and damage to either the spindle or the rotor necessitates replacement of both. This drawback is avoided in the present construction which employs a key 9 between spindle 4 and rotor end ring 10 to transfer torque from one to the other.

In the preferred construction end ring 10 is a separate piece and it is coupled to rotate with the rotor, the interlock between them being held to function by means of spring 7 holding the rotor 8 against the ring 10.

The rotor end ring 10 abuts against the inner race 11 of bearing 5, and this, in turn abuts against the flange 12 of fan 13 which is keyed to spindle 4 by key 14 and circulates air through openings 15 in casing 1 to cool the motor. A guard flange 16 at the upper end of the spindle has a hub flange 17 which is held against fan 13 by nut 18 engaging screw threads 19 on the spindle 4 and is restrained by key 20 from rotating relative to the spindle. The angular positions of rotor end ring 10, fan 13, and guard 16 with respect to the shaft or spindle 4 are fixed by keys 9, 14 and 20; their longitudinal positions on the shaft by nut 18 and spring 7 which constantly presses each of the members assembled on the upper end of the shaft into longitudinal engagement with the next adjacent member and holds the uppermost member, the guard flange 17, against nut 18. In case repairs are needed on any of the moving parts of the motor, the upper bearing support 21 is detached from motor casing 1 by unscrewing bolts 22. This permits the spindle or shaft to be removed vertically, the construction of the lower bearings, not shown in detail, being such as to allow the shaft or spindle to be slid longitudinally through them after loosening of the end thrust bearing referred to. The nut 18 can then be unscrewed to permit the removal of the elements assembled on the spindle for such repairs or replacements as may be necessary.

The spring 7 not only holds the members assembled on the shaft in longitudinal position but also allows differential expansion between the rotor and shaft. This is particularly important in high speed, high cycle motors with a large ratio of power to size and weight. These motors naturally run hotter than those built for less exacting service requirements and are, moreover, frequently used in intermittent operation with many starts and stops which interfere with the attainment and maintenance of a constant temperature distribution through the motor. With the present construction, the spring permits differential expansion between the shaft and rotor caused by differences in rates of temperature increase or decrease and by differences in expansion coefficients of the materials of which they are made.

I claim:

1. A rotating element for an induction motor comprising a shaft, a rotor concentric with the shaft, an abutment at one end of the rotor longitudinally fixed with respect to the shaft to limit longitudinal movement of the rotor on the shaft in one direction, means adjacent the same end of the rotor to prevent angular displacement of the rotor with respect to the shaft, and a spring seated between the other end of the rotor and a shoulder on the shaft to hold the rotor against the abutment.

2. In a high speed induction motor, a rotating shaft, a rotor mounted on said shaft with a light press fit, an abutment ring fastened to rotate with said shaft and interlocked to rotate with said rotor, and resilient means exterior to the electromagnetic parts of the rotor for holding said rotor in interlocking engagement with said ring to effect rotation thereof.

3. In a high speed induction motor disposed to operate in different positions usually with the shaft at an angle to the horizontal, a rotating shaft, a rotor mounted on said shaft with a light press fit, a ring keyed to said shaft at one end of the rotor, a coupling between the rotor and ring, and resilient means exterior to said rotor for holding said coupling in engagement.

MARION B. SAWYER.